Sept. 4, 1956  N. E. O'CONNOR  2,761,256
WORK DEVICE
Filed Dec. 8, 1954
2 Sheets-Sheet 1

INVENTOR
Neal E. O'Connor
BY
ATTORNEY

Sept. 4, 1956

N. E. O'CONNOR 2,761,256

WORK DEVICE

Filed Dec. 8, 1954

INVENTOR
Neal E. O'Connor
BY
ATTORNEY

United States Patent Office 2,761,256
Patented Sept. 4, 1956

2,761,256

WORK DEVICE

Neal E. O'Connor, Birmingham, Mich., assignor to General Motors Corporation, Detroit, Mich., a corporation of Delaware Application December 8, 1954, Serial No. 473,792

9 Claims. (Cl. 51—170)

This invention relates to power driven work devices generally and more particularly to power driven work tools including a relatively movable work belt or other member adapted to engage and perform work upon a work surface.

Power driven sanders and polishers which include a continuous work belt disposed between spaced pulleys require the work belt to be held taut to provide a flat working surface. If the belt is maintained too taut it may be easily damaged and if too slack the work efficiency of the device is considerably reduced. To eliminate this basic objection to work belt tools, backing plates disposed behind the working belt and between the pulley members have been proposed. These backing plates when stationary introduce friction forces generating heat which is detrimental to the serviceable life of the work belt. When such backing plates are relatively movable their effectiveness is considerably reduced.

It is now proposed to provide a power driven work tool including a continuous loop work belt backed up by a stationary plate forming a part of the work tool. It is proposed to minimize the frictional forces between the stationary backup plate and movable belt, to reduce the heat generated therebetween and to increase the serviceable life of the work belt by providing an air cushion between the work belt and backup plate, to hold the belt off from the backup plate and to assist in cooling the work belt. It is still further proposed to provide an air powered work tool with a stationary backup plate and air cooled and cushioned work belt without adding appreciably to the size, shape or weight of tools previously not including such features. It is proposed to utilize the exhaust air from the air driven belt pulleys thereby eliminating the need of an additional blower motor. It is still further proposed to provide a backup plate including an air distribution manifold and a plurality of outlets communicating with the work belt and spaced to uniformly hold off and cool the belt during its operation upon a work surface.

The proposed air cooling and cushioning backup plate may be adapted for use with most air powered work tools now on the market. The modification required to be made is simple, inexpensive and highly advantageous.

Figure 1:
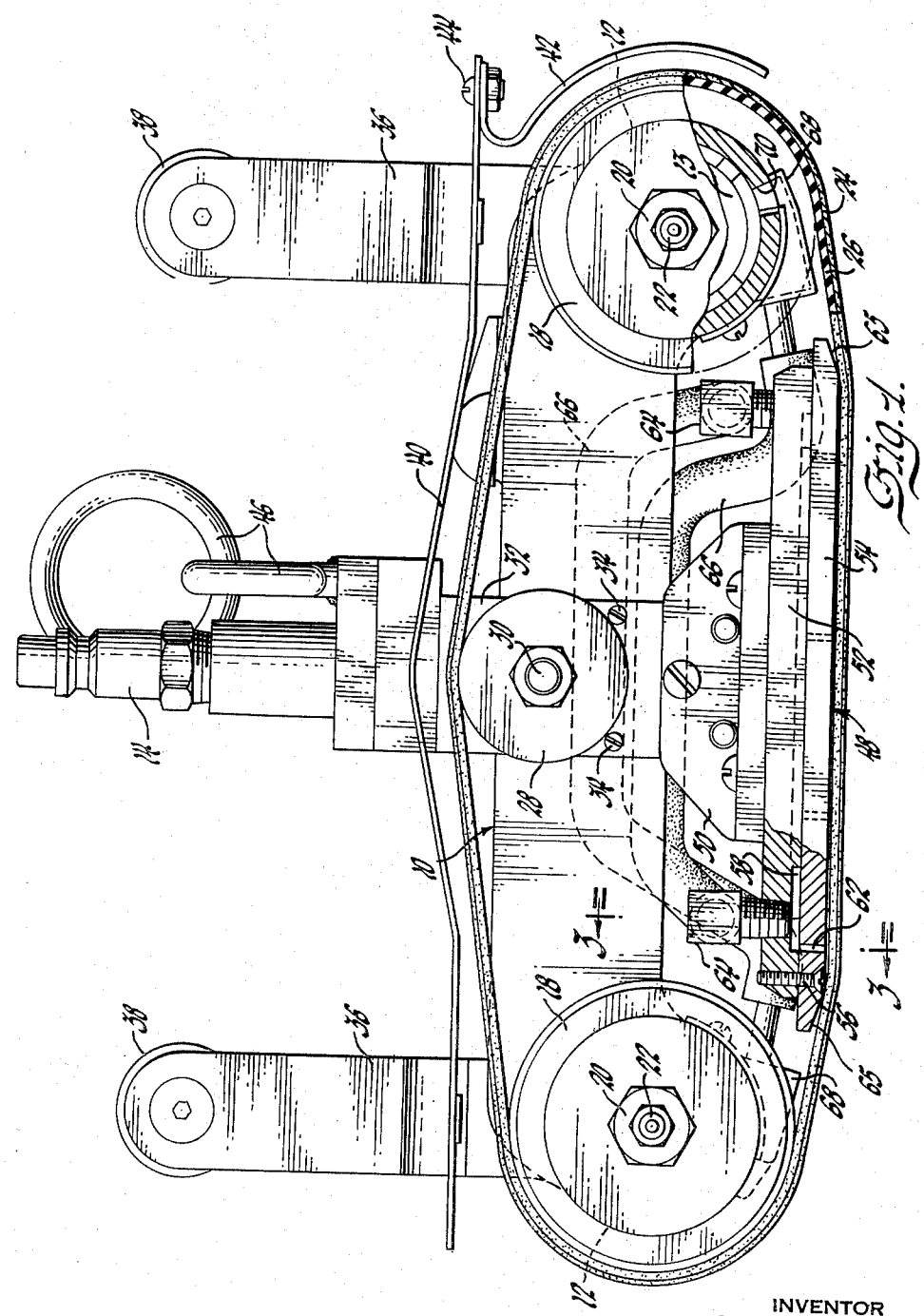
Figure 1 is a side elevational view of an air driven power sander including the present invention and having parts broken away and shown in cross-section.
Figure 2:
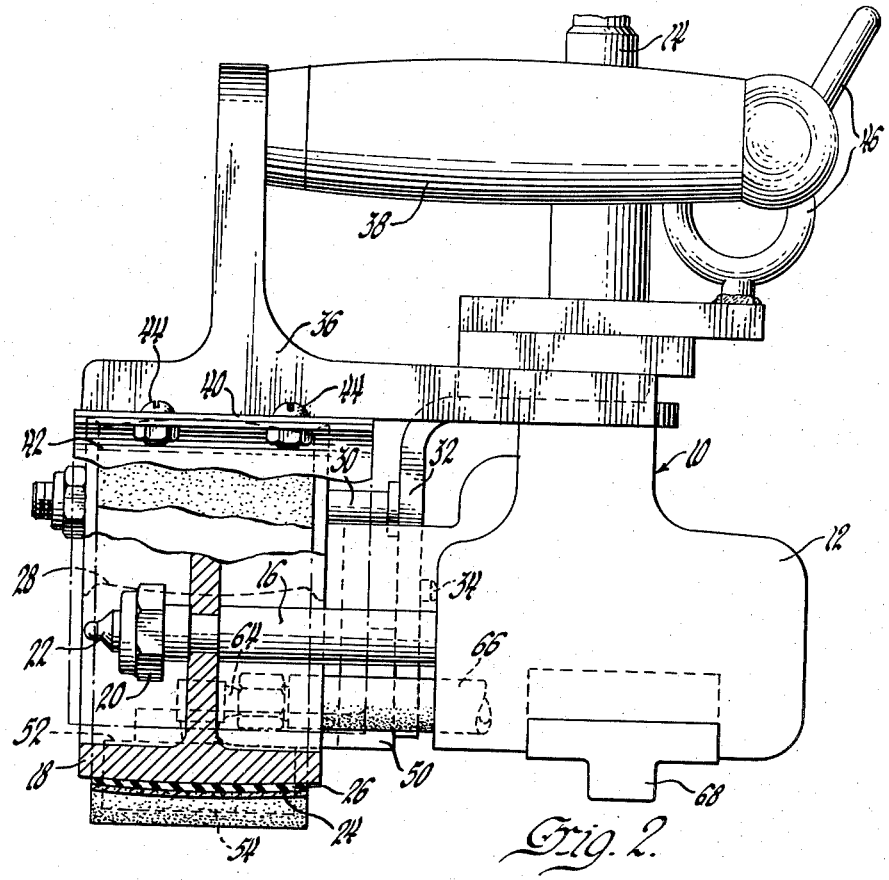
Figure 2 is an end view of the sander of Figure 1 having parts broken away and shown in cross-section.
Figure 3:
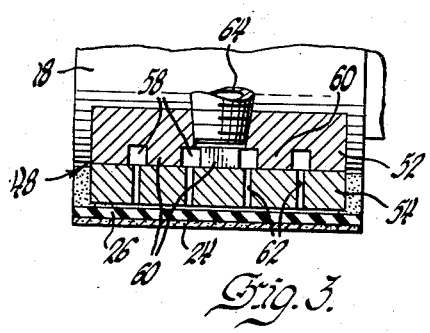
Figure 3 is a cross-sectional view of a part of the sander of Figure 1 taken in the plane of line 3—3 thereon and viewed in the direction of the arrows.

The work device shown is a power driven sander which comprises a casting 10 including drive motor housings 12 disposed at each end thereof. Air motors 13 are disposed within housings 12 and are driven by compressed air introduced to the casting 10 through fitting 14 and communicated to the motors in the conventional manner.

Shafts 16 driven by the air motors 13 extend outwardly from housings 12 in parallel spaced relation and have belt driving pulleys 18 secured near their outer ends by fastening means 20; here shown to include lubrication fittings 22. An abrasive continuous loop sanding belt 24 is disposed between the pulleys 18 upon a backing belt 26 of rubber or similar material. A guide roller 28 is rotatably mounted upon a shaft 30 secured to a guide roller support plate 32 itself secured to casting 10. The support plate 32 extends down one side of the casting 10 to dispose the guide roller 28 between the drive pulleys 18 and within the loop of the belts 24 and 26. Although the sander here shown makes use of two air motors 13, only one air motor need be employed to drive one of the pulleys 18 with the other of the pulleys being driven by the belt 26 and acting as an idler.

Handle supports 36 are secured to each end of the casting 10 and extend outwardly over the sanding belt 24 and upwardly to support a pair of handles 38. A shielding member 40 is secured to the supports 36 and extends over the sanding belt and in spaced relation thereto. A shield extension member 42 is secured to one end of the shielding member 40 by fastening means 44 and is disposed in spaced relation to the pulley 18 and belt 24.

A pair of lift rings 46 are secured to casting 10 near the center thereof to provide a means of lifting the sander and if required to receive means for limiting the travel of the device to the length of the air hose connection made to air fitting 14.

A belt receiving backup shoe 48 is disposed between the pulleys 18 and within and closely adjacent the belts 24 and 26. The shoe is secured to bracket 50 which is in turn secured to support plate 32. The shoe 48 includes an air manifold member 52 and a backing plate 54.

The air manifold member 52 is secured to the backing plate 54 by fastening means 56 and has the face thereof adjacent the backing plate undercut to provide a plurality of air passages 58 separated by dividing wall 60. The backing plate 54 includes a plurality of apertures 62 formed therethrough which communicate with the air passages of manifold member 52 when the manifold member is secured to the backing plate. The backing plate is beveled at opposite ends as at 65 to accommodate the belts 24 and 26 passing thereover. Set screws 34 are provided within the support plate 32 and engage casting 10 to permit adjustment of the disposition of the backing plate 54 between the pulleys 18.

Within opposite ends of the manifold member 52 are threaded air inlet fittings 64 which communicate with the air passages 58 of the manifold member. Flexible conduits 66 are connected to fittings 64 and communicate with the air motor housings 12. Air scoops 68 are secured to each housing 12 over an exhaust opening 70 formed therethrough. These scoops 68 are connected to conduits 66 to collect exhaust air from the air motor housings 12 and to supply such air to the backup shoe 48. If there is more air exhausted by the air motors 13 than can be dispersed through the backup shoe 48 without building up excess back pressure within the motors, then the scoops 68 should be disposed to only partially cover the openings 70. However, where only one air motor is employed, as previously suggested, it may be desirable to capture all of the exhaust air.

The exhaust air received from the air motor housings 12 is introduced into the manifold member 52 through fittings 64 at opposite ends thereof and is thereby conducted to the air passages 58 and uniformly distributed by passage dividing walls 60 throughout the manifold member. The exhaust air is in turn uniformly distributed by the air passages 58 through the apertures 62 of backing plate 54 to between the backing belt 26 and plate 54. The air pressure provided by the escaping exhaust air holds the belts 24 and 26 off from the backing plate 54 and in spaced relation thereto. The belt 26 is thus cushioned from the backing plate 54. Since the belt 26 is thus protected from the backing plate 54 there is a minimum of frictional engagement therewith and consequently a minimum generation of heat. Furthermore, the exhaust air directed against the belt 26 cools the belt and dissipates the small amount of heat conducted thereby to the sanding belt 24.

I claim:

1. A work tool including a pneumatically driven work member having a drive member engaged therewith for operating said work member, a perforated backup member disposed behind said work member and closely adjacent thereto, and means operatively disposed between said drive member and said backup member for collecting exhaust air from said drive member and for conveying said air through said backup member to said work member, said air being exhausted and distributed between said work member and backup member for cooling and cushioning said work member with respect to said backup member.

2. A work device including pneumatically driven and spaced drive members having a work belt engaged therebetween and driven thereby, a perforated backup member disposed between said drive members and closely adjacent and behind said work belt, and exhaust means connected between said drive members and backup member for conducting air exhausted by said drive means through said backup member to said work belt, said air cooling said belt and spacing said belt from said backup member.

3. A work device including an air driven motor, a work member engaged with and driven by said air motor, a perforated backup member disposed behind and adjacent said work member, an air scoop secured to said air motor for collecting exhaust air therefrom, a manifold system connected to said backup plate, and means connected between said air scoop and manifold system for conducting exhaust air to said manifold system for uniform distribution to said backup member, said backup plate in turn exhausting said air uniformly to said work member for cooling said work member and holding said work member apart from said backup member.

4. A work device including a pair of spaced air driven motors, belt drive pulleys connected to and driven by said air motors, a work belt engaged with and driven by said drive pulleys, a perforated backup plate secured between said drive motors behind and adjacent said work belt, air scoops secured to said air motors for collecting exhaust air therefrom, an air manifold connected to said backup plate, and means connected between each of said air scoops and one end of said manifold for conducting exhaust air to said manifold, said manifold uniformly distributing exhaust air through said backup plate to said work belt for cooling said work belt and holding said belt apart from said backup plate.

5. A work device including a power driven work member, a perforated backup member including an otherwise smooth backing surface engaged with and disposed behind said work member, a source of pressurized air, an air manifold connected to said backup member, said manifold including air passages communicating with the perforations formed through said backup member, and means connecting said source of pressurized air to opposite ends of said manifold for uniformly distributing pressurized air through said manifold and backup member to said work member, said air cooling said work member and spacing said work member out of engagement with said backup member in the immediate vicinity of each of said perforations and having the cumulative effect of uniform spacing of said work member passing thereover apart therefrom with a minimum requirement of pressurized air.

6. A work device including an air powered drive motor, a work member connected to and driven by said air powered drive motor, a backup member secured behind said work member, and means for collecting air exhausted from said air powered drive motor and for uniformly distributing said air between said backup member and work member to cool said work member and to space said work member apart from said backup member.

7. A belt sander including a pair of spaced belt driving air motors, a sanding belt engaged with and driven by said air motors, a backup plate secured behind said sanding belt and between said air motors, air scoops secured to said air motors for collecting the exhaust air therefrom, and means for distributing said exhaust air uniformly between said backup plate and sanding belt.

8. A work tool including a pair of belt driving air motors secured in spaced relation to one another and having a work belt engaged therewith and driven thereby, a backing plate secured between said air motors and behind said work belt, a plurality of uniformly spaced apertures formed through said backing plate, air scoops secured to said air motors for collecting exhaust air therefrom, an air manifold connected to said backing plate and including air passages communicating with said apertures of said backing plate, and means connected between said air scoops and opposite ends of said air manifold for introducing exhaust air from said air motors through said air passages to said apertures for uniform distribution to said work belt, said air cooling said belt and holding said belt apart from said backing plate.

9. A belt sander including a pair of spaced belt driving air motors, a sanding belt engaged with and driven by said air motors, a backing plate secured between said air motors and behind said sanding belt, means connected to said air motors for collecting exhaust air, an air manifold connected to said backing plate, said manifold having air passages formed therein and said backing plate including a plurality of uniformly spaced apertures formed therethrough and communicating with said passages, and means connecting said air collecting means to said manifold for distributing said exhaust air through said backing plate and uniformly between said backing plate and sanding belt.

References Cited in the file of this patent

UNITED STATES PATENTS

| | | |
|---|---|---|
| 1,864,027 | Pedersen | June 21, 1932 |
| 2,070,257 | Coates | Feb. 9, 1937 |
| 2,279,782 | Fowler | Apr. 14, 1942 |
| 2,296,990 | Fowler | Sept. 29, 1942 |
| 2,617,239 | Steurer | Nov. 11, 1952 |
| 2,618,913 | Plancon | Nov. 25, 1952 |